July 25, 1944.  H. L. JOHNSON  2,354,377
CORN GRADING APPARATUS
Original Filed Feb. 4, 1942   2 Sheets-Sheet 1
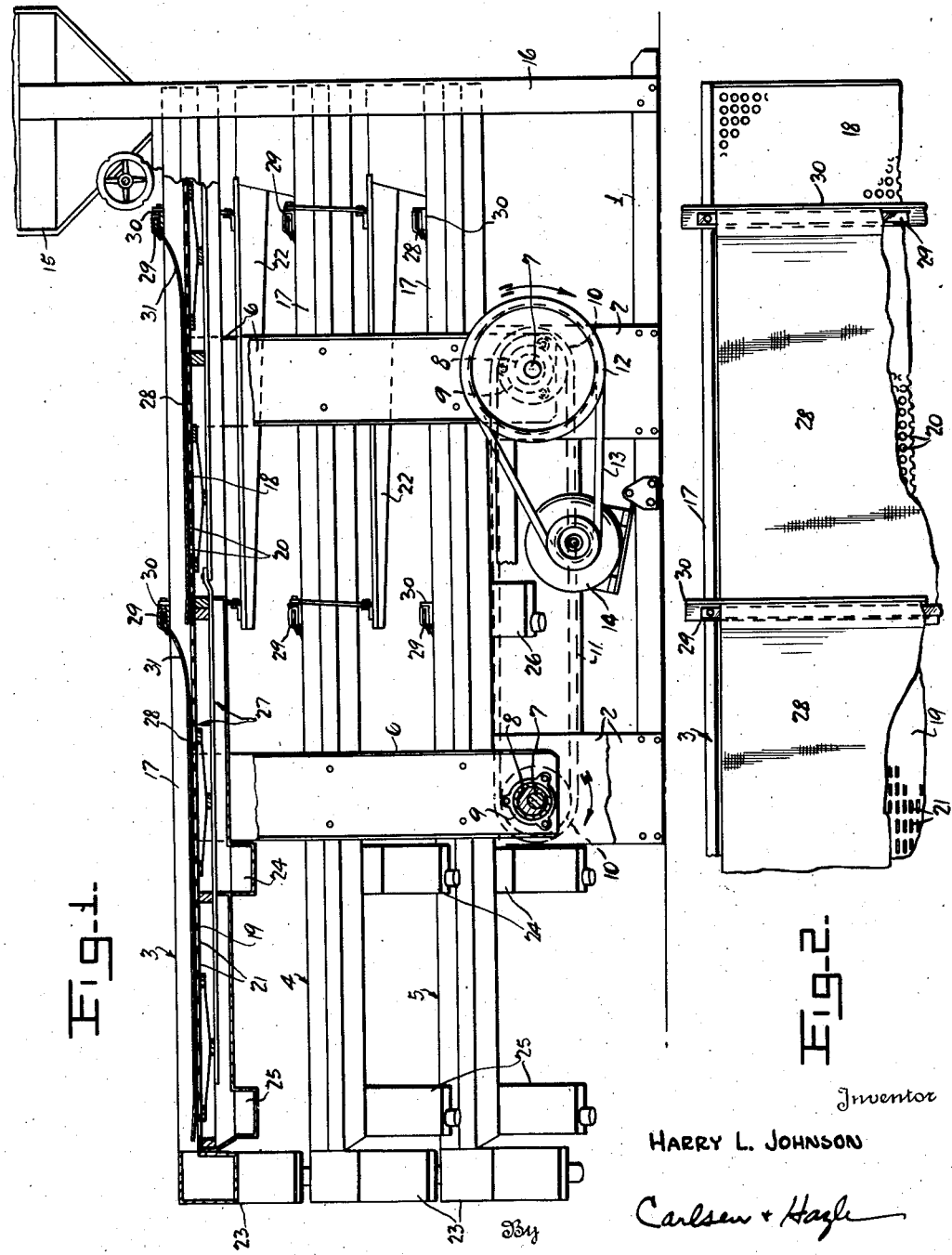
Inventor
HARRY L. JOHNSON Inventor
HARRY L. JOHNSON By Carlsen + Hazle
Attorneys Patented July 25, 1944

2,354,377

UNITED STATES PATENT OFFICE 2,354,377

CORN GRADING APPARATUS

Harry L. Johnson, Minneapolis, Minn.

Original application February 4, 1942, Serial No. 429,492. Divided and this application April 24, 1943, Serial No. 484,368

3 Claims. (Cl. 209—266)

This invention relates to apparatus for grading or separating hybrid seed corn into a plurality of closely dimensioned sizes to facilitate planting operations.

The primary object of this invention is to provide for a machine or apparatus of this kind, a novel and effective screen assembly, and operating or vibrating mechanism therefor, adapted to move the corn over the screens rapidly and constantly while causing it to come into effective contact with the screens for proper separation thereby. The corn must be graded both as to width and as to thickness for proper planting and the screens thus have round holes for width grading and elongated or slotted holes for thickness grading. To properly grade the corn kernels requires that the corn be tumbled about by the motion of the screens, while advancing thereover, so that the kernels will be presented at different angles and in different positions to the holes, as will be evident, and it is these actions which my invention aims to bring about in an effective manner.

Another object is to provide a peculiar and novel vibrating motion for the screens and an arrangement of aprons which overlie the screens and the corn thereon, the particular screen motion and the aprons cooperating to move the corn along the screens from one end to the other while tumbling about and coming repeatedly into contact with the variously shaped holes in the screens.

These and other more detailed and specific objects will be disclosed in the course of the following specification, reference being had to the accompanying drawings, in which—

Fig. 1 is a side elevation of a machine or apparatus embodying my invention, with one screen shoe or deck, and other parts, broken away to disclose the aprons and the eccentrics for vibrating the screens in accordance with my invention.

Fig. 2 is a fragmentary plan view of one screen shoe or deck showing the aprons on the screens.

Figure 3:
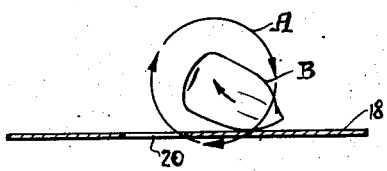
Figs. 3 through 6 are diagrammatical views showing the effect of my novel screen motion on the corn thereon, the apron not being shown.
Figure 4:
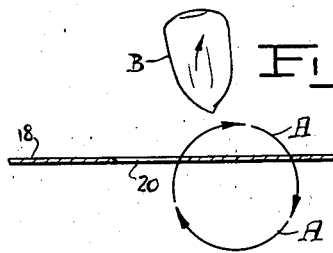

This application is a division of my copending application for Corn sizing apparatus, Serial No. 429,492 filed February 4, 1942, to which application attention is invited for a complete disclosure of the apparatus per se. The present invention being limited to the screen motion, and the vibrating means therefor, and the arrangement and cooperating functioning of the aprons, the machine as a whole will be only briefly described herein.

Referring particularly to Figs. 1 and 2 the apparatus is seen to comprise a frame having base members 1 and upright bearing members 2 arranged in transversely spaced pairs providing room therebetween for the screen assembly which, in the embodiment here disclosed, includes three superimposed screen decks or shoes 3, 4 and 5 secured between upright side members 6 which, at their lower ends, are disposed loosely between said bearing members 2. Shafts 7 are journaled transversely through the bearing members 2 and carry eccentrics 8 each of which rotates in a housing or bearing 9 secured to the lower end of each side member 6, so that the entire screen assembly is supported by and upon the eccentrics.

The shafts 7 are connected at one side of the machine by sprockets 10 and a chain 11 so that they will rotate in unison and in the same direction, while one shaft also carries a belt pulley 12 over which is trained a belt 13 from an electric motor 14, which serves to rotate the shafts.

A feed hopper 15 is supported above one end of the uppermost screen shoe 3 by upright corner parts 16 of the frame. The corresponding end of each screen shoe, and of the screens therein, is called the head or feed end while the opposite end is termed the tail or delivery end, and it will be noted that the screen shoes have only a very slight slope from one end to the other. This inclination may be even less, by virtue of my novel screen motion and apron arrangement while still providing for the necessary travel movement of the corn lengthwise along the screens, and the substantially horizontal screens of course have the advantages of conserving head room and preventing the effects of gravity from effecting the travel movement of the corn.

The screen shoes or decks 3, 4 and 5 are substantially duplicates and the details of only the upper shoe will be described with corresponding reference characters designating corresponding parts of the others. This shoe 3 has a frame including side members 17 in which are formed grooves to receive a pair of screens designated at 18 and 19 which are inserted endwise, drawer fashion, through the head end of the screen assembly and into said grooves. The screen 18 nearest the head has round holes 20 for width grading, while the screen 19 next to the tail has slotted holes 21 for thickness grading. The corn passing through screen 18 is caught by an inclined return pan 22 which carries it back to the head of the screen shoe next below, while the overs, or corn rejected by screen 18, flows on over screen 19. The rejects from this screen are delivered at the tail end into a laterally discharging chute 23. The holes in the half of screen 19 nearest the head are of different size than those in the tail half and the throughs, or the corn passing through these different sized openings is separately collected and delivered through laterally discharging chutes 24 and 25.

In lieu of the return pan for the lowermost shoe 5 a delivery chute 26 is provided which delivers the corn passing through the lowermost round holed screen. Each shoe furthermore, has a wiping mechanism, designated generally at 27 and operated by suitable means (not shown) from the motor 14, for clearing out the corn which may become lodged in the screens, but this mechanism forms no part of the present invention and will not be detailed herein.

In accordance with my present invention each screen 18—19 is provided with one apron, designated at 28, of cloth, or any suitable flexible light sheet material, which is secured at one end to a bar 29. This bar is mounted, as upon the cross members 30, transversely across the shoe side frames 17 near and above the head end of each screen so that the other end, and greater part of the length of each apron, may trail off loosely down over the screen towards its tail end. The aprons are of such length and width as to substantially cover all of the associated screens, as indicated in Figs. 1 and 2. The upward bend 31 of the aprons from the screens toward the bars 29 provides an opening so that the corn may readily work beneath the aprons as it travels toward the tails of the screens as will be apparent.

Referring now to the diagrammatical illustrations of Figs. 3 through 10, I will describe the novel rotary vibratory action of my screens and the cooperative part played therein by the various aprons heretofore described.

The eccentrics 8, as indicated by the arrows in Figs. 1 and 3 through 10, rotate in a clockwise direction when viewed from the side of the machine at which the direction of corn travel is from right to left, and as the screens are viewed throughout the drawings. In other words the screens are given a rotary motion such that as they move in the general direction of their delivery ends they are traveling the lower part of their circular path. This, to my knowledge, is novel in and of itself, inasmuch as the "undershot" or lower arc of the rotary movement constitutes the actual propelling or working stroke while the "overshot" or upper arc is the return stroke. In other words, the corn kernels, due to their weight, are propelled upwardly and forwardly during the travel of the screens over the corresponding part or arc of travel of the screen, being thrown clear of the screen so that they may turn in the air and thus come in contact with the holes in the screens in the various positions required for their ultimate passage through the holes, if of the proper size to thus pass. It is found in practice that the corn kernels as they fall and impinge the screens are thrown upwardly again and again and in many directions, but the movement in mass, or in sum, is generally in a forward direction to the extent that the corn travels continuously from the heads toward the tail ends of the screens.

Throughout the diagrams of Figs. 3–10 the movement of the screen, designated for example only as the screen 18, or of any selected point on the screen, is indicated by the circle A and the direction of such movement is designated by the arrows. A corn kernel is designated at B while one round hole or opening in the screen is shown at 20.

Referring first to Figs. 3–6 in detail the action of my novel screen movement on the corn will be described. Assuming the screen to be at a point near the lower limit of its travel, as in Fig. 3 and the corn kernel B at rest, momentarily, on the screen, the forward and upward movement of the screen toward the position of Fig. 4 will impart a corresponding movement to the corn kernel as represented by the arrows shown thereon, throwing it into the air clear of the screen. As the screen continues its upward movement, as in Fig. 5, the corn will continue its tumbling movement and while this takes place the screen will then start moving downwardly and rearwardly, as in Fig. 6, and when the corn again impinges the screen it will, most likely, be advanced somewhat from its starting position in the direction of the delivery end of the screen. This action is repeated continuously and the corn dances and tumbles about on the screen while gradually advancing thereover. The kernels are evidently brought continuously into contact from many directions and angles with the screen and will, if of proper size, of course in time pass through some of the openings. It will be noted that the fundamental upward movement of the corn, has a rearward component, as represented by the arrows in Figs. 4 and 5, so that the corn actually tumbles rearwardly at some times, and this in spite of the fact that the screen, by its rearward movement while the corn is "in the air" so to speak, causes the sum of the movement to be in a forward direction. The feed or travel movement is thus retarded by this rearward (or sideward) component of the movement of the corn and the resultant useless rearward and sideward dancing or tumbling.

The aprons, described in detail previously herein, and indicated at 28 in the diagrams of Figs. 7–10, play an important part in the traveling of the corn over the screens and to a large extent eliminate the useless retrograde or sideward tumbling of the corn as just described.

I am aware that aprons have been used heretofore for the purpose of pressing the material being screened down onto the screens or holding the particles flat to the screen but this is not the function of my aprons in that they do not exert any appreciable pressure or weight on the corn. As a matter of fact, the aprons are light enough in weight so that they will rise and fall to some extent as the corn kernels are propelled upwardly by the screen movements, and thus the aprons have what may be termed a floating action. The aprons further have a direct cooperative relationship with my novel and particular direction of rotation and vibration of the screens as will presently appear.

Figure 5:
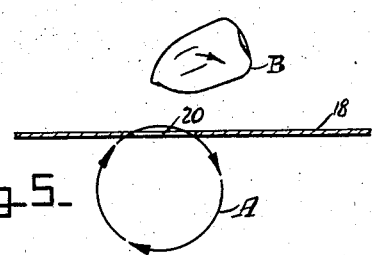
Figure 6:
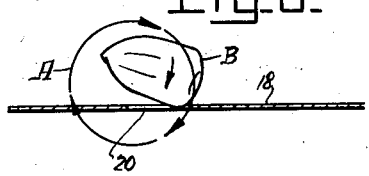
Figure 7:
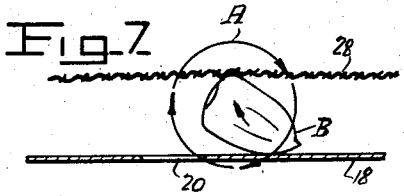
Figs. 7 through 10 are similar views illustrating the action with the apron used on the screen.
Figure 8:
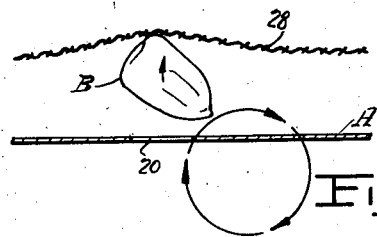
Figure 9:
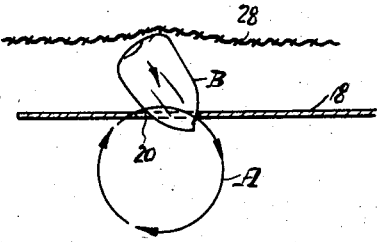
Figure 10:
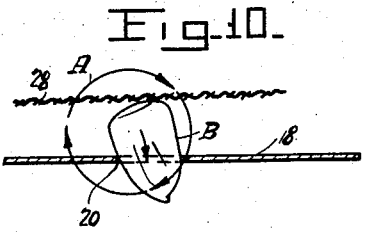

To facilitate comparison, the screen and corn kernel are shown as passing through the same cycle of movement in Figs. 7–10 as that shown in Figs. 3–6. Thus in Fig. 7 the corn kernel B is impelled upwardly and forwardly by the corresponding movement of the screen 18, and as seen in Fig. 8 the kernel leaves the screen in its upward movement while it is given a tumbling movement as designated by the arrows. The apron 28 rises slightly as this occurs, permitting only limited upward movement of the corn. As will be clearly evident, however, the tendency toward rearward tumbling by the corn, as shown in Fig. 5, is prevented and counteracted by the apron which causes the corn to move back downward toward the screen as in Fig. 9 until it reaches the screen again or starts to pass through the opening therein as represented in Fig. 10. Actually the apron prevents the corn from dancing or bounding too freely, as the screen moves downward on its return stroke, and causes the corn to, in effect, ride the screen at all times except when the same is moving upward and forward and throwing the corn in corresponding directions. Obviously the feed movement, as well as working contact between corn kernels and screen, are thus increased.

The rotary, vibratory motion of the screen has a tendency to throw the apron upwardly and back, in a direction toward the head end of the screen, thus providing clearance for the necessary tumbling movement of the corn. The apron, however, is so light as compared to the weight of the mass or layer of corn on the screen, that this tendency is very slight and the apron never wrinkles or curls up to such extent as to expose the screen.

All of the screens, of course, move as a unit, being rigidly tied together and supported on the eccentrics as previously described, and the actions herein set out therefore take place over all of the screens.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a corn grading apparatus of the character described and having at least one substantially horizontal screen adapted to receive the corn at one end and deliver rejected corn from its other end, means for moving the screen in a rotary path and in a vertical plane such that the screen moves in the direction of its delivery end during its travel over the lower part of said circular path whereby the corn will be projected first upwardly and toward the delivery end of the screen but with a component of movement tending to cause individual kernels to tumble back in the opposite and other directions, and an apron arranged to rest upon the corn as it passes along the screen for resisting such tumbling tendency of the corn.

2. In a corn grading apparatus of the character described, a screen adapted to receive the corn at one end and deliver the rejected portion thereof after travel towards its other end, the said screen being operatively arranged for movement in a rotary path about a transverse and substantially horizontal axis such that it moves in the direction of its delivery end during substantially the lower part of its travel in such path, whereby the corn will be first projected forwardly and upwardly in the general direction of the delivery end of the screen but will ultimately be given a tumbling motion tending toward movement also in a direction away from said delivery end, and an apron member loosely overlying the corn on the screen and adapted to resist the tumbling of individual kernels in any direction other than that leading toward the delivery end of the screen.

3. In a corn grading apparatus, a screen frame having a substantially horizontal screen therein and mounted on a pair of rotary eccentrics whereby the frame and screen may be vibrated by rotary motion, means for supplying corn to the receiving end of the screen, a flexible apron overlying the screen to rest upon corn passing over the screen, said apron being secured by its edge nearest the receiving end of the screen to the frame, and means for rotating the frame on said eccentrics in a direction which will move the screen toward the delivery end thereof and upwardly while the eccentrics move through under arcs of travel, whereby the corn will be advanced over the screen and under the apron from the receiving end to the opposite or delivery end of the screen while some of the corn passes through the screen.

HARRY L. JOHNSON.